(12) United States Patent
Caldwell et al.

(10) Patent No.: US 12,098,535 B2
(45) Date of Patent: Sep. 24, 2024

(54) APPARATUS, SYSTEM AND METHOD FOR CONNECTING TO, MONITORING AND CONTROLLING BODILY WASTE RECEPTACLES

(71) Applicant: JABIL CIRCUIT, INC., St. Petersburg, FL (US)

(72) Inventors: Barry Caldwell, St. Petersburg, FL (US); Gustavo Suarez, St. Petersburg, FL (US)

(73) Assignee: JABIL CIRCUIT, INC.

( * ) Notice: Subject to any disclaimer, the term of this patent is extended or adjusted under 35 U.S.C. 154(b) by 565 days.

(21) Appl. No.: 15/537,764

(22) PCT Filed: Dec. 18, 2015

(86) PCT No.: PCT/US2015/066819
§ 371 (c)(1),
(2) Date: Jun. 19, 2017

(87) PCT Pub. No.: WO2016/100886
PCT Pub. Date: Jun. 23, 2016

(65) Prior Publication Data
US 2018/0038089 A1    Feb. 8, 2018

Related U.S. Application Data

(60) Provisional application No. 62/094,648, filed on Dec. 19, 2014.

(51) Int. Cl.
| | |
|---|---|
| *E03D 9/08* | (2006.01) |
| *A47K 3/26* | (2006.01) |
| *A47K 5/12* | (2006.01) |
| *A47K 10/48* | (2006.01) |
| *A47K 11/12* | (2006.01) |

(Continued)

(52) U.S. Cl.
CPC ............. *E03D 9/08* (2013.01); *A47K 3/26* (2013.01); *A47K 5/1217* (2013.01); *A47K 10/48* (2013.01); *A47K 11/12* (2013.01); *E03C 1/055* (2013.01); *E03D 5/10* (2013.01); *E03D 5/105* (2013.01); *E03D 13/005* (2013.01); *G05B 15/02* (2013.01); *A47K 3/001* (2013.01); *A47K 3/28* (2013.01); *E03C 1/0408* (2013.01); *E03C 1/046* (2013.01);

(Continued)

(58) Field of Classification Search
CPC ...... A47K 3/28; E03C 2001/0418; E03D 7/07
USPC ................. 4/615, 579, 313; 239/70
See application file for complete search history.

(56) References Cited

U.S. PATENT DOCUMENTS

| | | | | |
|---|---|---|---|---|
| 2006/0225200 | A1* | 10/2006 | Wierenga | B60R 15/00 4/664 |
| 2011/0186154 | A1* | 8/2011 | Klicpera | B67D 7/08 137/551 |
| 2012/0317709 | A1* | 12/2012 | Oates | E03D 5/105 4/313 |

* cited by examiner

Primary Examiner — Lauren A Crane
(74) *Attorney, Agent, or Firm* — Riverside Law LLP

(57) ABSTRACT

An apparatus, system and method for a receptacle suitable for control, data collection, and remote management. An exemplary receptacle may include a basin for receiving at least one viscous element; at least one sensor physically associated with the basin; and at least one actuator responsive to the at least one sensor, wherein actuation of the actuator outputs the viscous element to the basin. The receptacle may further include a controller at least partially physically proximate to the basin and capable of controlling the actuation of the at least one actuator; and a control system communicative with the local controller over at least open data path, wherein the control system imposes a plurality of rules to the controller.

18 Claims, 6 Drawing Sheets

(51) Int. Cl.
  E03C 1/05     (2006.01)
  E03D 5/10     (2006.01)
  E03D 13/00    (2006.01)
  G05B 15/02    (2006.01)
  *A47K 3/00*       (2006.01)
  *A47K 3/28*       (2006.01)
  *E03C 1/04*       (2006.01)
  *E03C 1/046*      (2006.01)
  *E03C 1/18*       (2006.01)
  *E03D 3/12*       (2006.01)

(52) U.S. Cl.
  CPC ................ *E03C 1/057* (2013.01); *E03C 1/18* (2013.01); *E03D 3/12* (2013.01)

APPARATUS, SYSTEM AND METHOD FOR CONNECTING TO, MONITORING AND CONTROLLING BODILY WASTE RECEPTACLES

CROSS-REFERENCE TO RELATED APPLICATIONS

The present disclosure claims priority to International Application No. PCT/US2015/066819, entitled: APPARATUS, SYSTEM AND METHOD FOR CONNECTING TO, MONITORING AND CONTROLLING BODILY WASTE RECEPTABCLES," FILED Dec. 18, 2015, which claims priority to U.S. Provisional Application No. 62/094,648, entitled "APPARATUS, SYSTEM AND METHOD FOR CONNECTING TO, MONITORING AND CONTROLLING BODILY WASTE RECEPTACLES," filed Dec. 19, 2014, the contents of which is incorporated by reference in its entirety herein.

BACKGROUND

Field of the Invention

This present disclosure is directed to water management apparatuses, systems, and methods, and, more particularly, to apparatuses, systems and methods of controlling bodily waste and related receptacles, and of subjecting bodily waste and related receptacles to data collection and management.

Background of the Invention

Water management is a significant issue. For example, the sanitation system for human and animal waste is a large consumer of water in countries with modern sanitary appliances. For human waste management, the sources of consumption may be considered as a number of streams: namely homes, public buildings, private buildings, government buildings, and so on.

All of the foregoing receive waste from restroom(s) or other sources. Restroom waste comes from two main sources, namely urinals and commodes (toilets).

In the United States, APAC (Japan, China) and the European Union, and in most developed countries, restroom human-waste receptacles are subject to volume control for water used in the flush cycle. The flush cycle may be initiated manually or automatically.

Therefore, needs exists for water management apparatuses, systems, and methods, and, more particularly, for apparatuses, systems and methods for controlling bodily waste receptacles, and for subjecting bodily waste receptacles to data collection and management.

SUMMARY

The present disclosure provides at least an apparatus, system and method for a receptacle suitable for control, data collection, and remote management. An exemplary receptacle may include a basin for receiving at least one viscous element, such as water, air, or soap; at least one sensor physically associated with the basin; and at least one actuator responsive to the at least one sensor, wherein actuation of the actuator outputs the viscous element to the basin. The receptacle may further include a controller at least partially physically proximate to the basin and capable of controlling the actuation of the at least one actuator; and a control system communicative with the local controller over at least open data path, wherein the control system imposes a plurality of rules to the controller.

Accordingly, the disclosure provides water management apparatuses, systems, and methods, and, more particularly, provides apparatuses, systems and methods for controlling bodily waste and related receptacles, and for subjecting waste receptacles to data collection and management.

BRIEF DESCRIPTION OF THE DRAWINGS

The accompanying drawings are included to provide a further understanding of the disclosed embodiments. In the drawings, like numerals represent like elements, and.

DETAILED DESCRIPTION

It is to be understood that the figures and descriptions of the present disclosure have been simplified to illustrate elements that are relevant for a clear understanding of the disclosure, while eliminating, for the purpose of clarity and brevity, many other elements found in similar apparatuses, systems, and methods. Those of ordinary skill in the art may thus recognize that other elements and/or steps are desirable and/or required in implementing the present disclosure. However, because such elements and steps are well known in the art, and because they do not facilitate a better understanding of the disclosure, a discussion of such elements and steps is not provided herein. Nevertheless, the disclosure herein is directed to all such variations and modifications to the disclosed elements and methods known to those skilled in the art.

The presently disclosed receptacle apparatus, system and method (hereinafter also referred to as "flush mechanism") provide advantages over available technologies. For example, the flush mechanism may provide a processor-based controller and detector circuit ("controller"). The controller may be realized in a number of different configurations, such as using a standalone computer processing unit (CPU) with support circuits, a system on a chip (SOC) with support circuits, and/or a network controller unit (NCU) with support circuits, by way of non-limiting example. The CPU/SOC/NCU may manage data and control interfaces for networked connections, such as through either wired or wireless technologies; may allow for remote control of operation of one or more receptacles across one or more facilities by application of rule sets, may provide a programmable graphical user interface for input and implementation of rule sets; and may allow for diagnostics and reporting, among many other aspects.

By way of particular example, such a flush management mechanism may allow for controlling and tracking an amount of water consumed by a receptacle. This tracking may be subject to a rule set that provides an alarm if there is a malfunction, such as wherein the receptacle starts flushing when no user cycles are active or users being present are detected.

Moreover, the aforementioned communication connection may allow for local or remote functionality, such as the referenced diagnostics of one or more human waste receptacles. Likewise, the networked nature of presently disclosed embodiments may allow for diagnostics in an isolated, remote, or connected mode. Similarly, the remotely connected aspects may allow for remote activation, deactivation, reset, control and tracking of the disclosed apparatuses, systems and methods.

Figure 1:
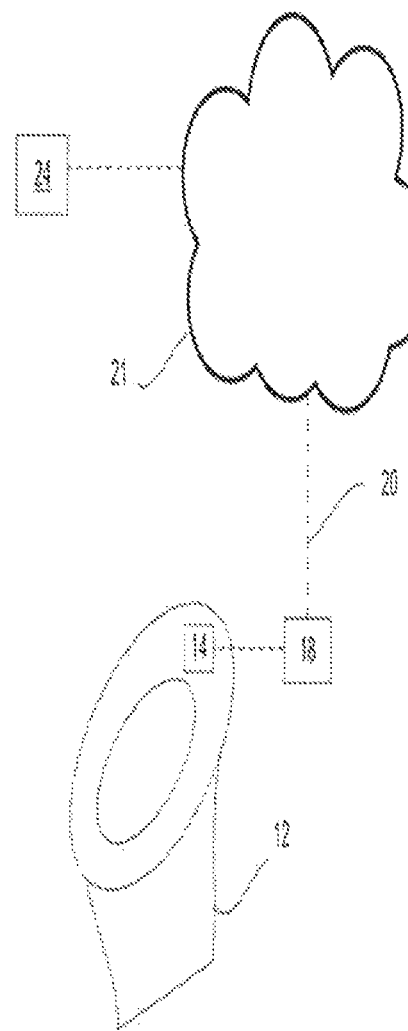
FIG. 1 illustrates a schematic block diagram of aspects of an exemplary receptacle according to the disclosure.

FIG. 1 is a schematic and block diagram illustrating hardware and software apparatuses in an exemplary embodiment of the presently disclosed systems and methods. As shown, hardware and combination hardware/software aspects may include a commode/waste receptacle 12, which may be, for example, a waste receptacle, water dispenser, or the like. The receptacle 12 may have associated therewith one or more solenoids, motors, microcontrollers, and the like 14, which may be comprised of hardware and/or hardware and software (hereinafter also referred to as "receptacle hardware 14") and which, when actuated, may execute, by way of non-limiting example, a flush, water dispense, or the like, that is, may execute an output of a viscous element. Receptacle hardware 14 may additionally include, for example, presence detection, environmental sensors, and the like, which may subject to monitoring and control by controller 18.

The hardware/software aspects may further include a local, remote, or partially local controller 18 for controlling the actuator/solenoid/motor 14, which comprises a data path 20 to a wholly local, wholly remote, or partially local and partially remote control system 24, such as through wired or wireless communications. Data path 20 may be or include wired Ethernet, Wi-Fi, Bluetooth, ZigBee, and/or serial interfaces such as USB, RS232 or RS422, IR and the like, and may form part of one or more networks 21. The controller 18 and control system 24 may be or include data and/or rule sets for controlling operation of the solenoid/motor in a variety of environments and under a variety of conditions. As such, control system 24 may have, associated therewith, one or more computing memories for the storage of one or more databases, rule sets, algorithms, and the like.

The controller 18 and the control system 20 may be or include a central processing unit (CPU) or micro control unit (MCU), for example, such that controlling and/or monitoring functions may be provided from firmware/software hard coded into the CPU/MCU, or resident in a memory device communicatively associated with the CPU/MCU. The firmware software may also provide a graphical user interface (GUI) in association therewith, from which reporting, monitoring, modification, or upgrading may be performed. Similarly, modifications or upgrades to operation or application code may automatically (or manually, such as via the GUI) modify the controller functions or functionality 18.

The controller 18 may comprise CPU-controllable devices such as power FETs/bipolar or like transistors, microcontrollers, and other voltage/current devices to allow the control of solenoids, motors, sensors, relays, switches, electro-mechanical devices, and the like 14 such as may be used to activate desired functions such as flushers, shower heads, tub fill spouts, faucets, bidets, cleaning systems, and the like 12.

The implementation of a CPU/software controlled apparatus, system and method allows for the management of resources deployed by receptacles 12, i.e., water, electricity, and other consumables, pursuant to the rule set stored in association with and/or entered into the control system. Further, the use of such a system, apparatus, and method allows for real time configuration of resource usage in toilets, urinal, and other devices.

By way of non-limiting example, in an embodiment dynamic configuration of flush volumes may be a programmable feature of the system. Standard flush volumes are defined in most locations by either local or federal regulation. More particularly, urinals are defined to consume 1 gallon (0.5 g Ca) per flush or less, and toilets are defined to consume 1.6 gallons (1.28 g CA) per flush or less. In commercial applications, for example, the use of a CPU/software controlled flusher allows the volume to be adjusted per regulation changes without having to physically visit the site of each receptacle, such as based on the assumption that the physical design of the device can adapt to changes in water volume and still perform within accepted limits.

In an additional example, the number of flushes and flush volume may be varied based on usage model, such as time-based usage of urinals in a baseball or football stadium. For example, during the 7th inning stretch of a Major League baseball game, or halftime of a National Football League game, there is an anticipated large-scale usage of the urinals. In such a situation, the CPU/software controlled urinal may change flush cycles from every user to every N=4 user, wherein N may be programmable via the control system 24. For a pro-sport stadium or venue this may cut water usage during an event by 50% or more over the full event.

The CPU/software controller 18 may also manage the injection of cleaning and/or odor control fluids into the flush cycle in high volume or low volume situations, and/or as part of normal maintenance operation. In an additional exemplary embodiment, dynamic volume control may be geographically-based, such as based on local water-usage restrictions, wherein flush volumes and durations may be remotely programmed to ensure proper flushing and to regulate overall usage.

Moreover, the disclosed apparatus, system, and method may allow for different flush flow mechanisms to address the effectiveness of the flush. By way of non-limiting example, in most known applications a flush is a continuous flow of water. However, in the disclosed exemplary embodiments, the flush flow may comprise an adaptive flow algorithm consisting of long and short bursts of water or fluids to facilitate the clearing of a surface, such as a bowl or basin, which may be particularly effective in low flow applications. By way of example, a receptacle may flush at 50% for a predetermined time period or upon a triggering event, and may thereafter switch to 75% to 100% of maximum volume per flush for a different time period or upon a triggering event.

As referenced, the disclosed exemplary embodiments may include, as part of control system 24, data collection and analysis rules. Key data analysis areas may include, but are not limited to: water flow volume usage (metering); power usage (if hardwired); battery status (if battery operated), or alternative power source health (solar, hydraulic, fuel cell, etc.); failures; active times; service activities; ambient temperature (for pipe maintenance, etc.); security issues; time since install/activation; code status (revision levels, updates, etc.); number of dual flush vs single flush activations (in dual flush toilet applications); and the like.

Analysis reports may be provided via the aforementioned GUI, and/or may be directly provided, such as via an application ("app"), mobile app, paper format, email, or the like, to the facilities' owner(s) (such as by restroom, by receptacle, by facility, by geographically concentric facilities, by usage level, by expense level, or the like), to government/utilities, to suppliers/manufacturers (such as for warranty and maintenance servicing). Likewise, mobile reporting, such as via the GUI in the mobile app, may allow for on-site trouble-shooting and analysis. In embodiments, an app (or multiple individual apps) may include features such as: on/off; flush models and cycles; water usage algorithms; power mode control algorithms; diagnostics (local and remote); physical intrusion and damage alarms; hacking alarms; and the like.

As referenced, receptacle hardware 14 may include sensors and the like, including sensors to assess the presence of an individual in association with the receptacle 12. Such a user presence detector 14 may employ infrared (IR), sonic, radar, or visible light, by way of example, as a detection media, such as using a processing algorithm running on the CPU. By using a CPU and software-based user detection and water management control structure, rather than the typical simple IR (send/receive) method, multiple detection and function control modes of operation may be provided. Such a structure allows for automatic flush management functions, such as to avoid "false" or long duration flushes, thereby limiting water waste.

Presently, the most prevalent technology for the detection of a user at the receptacle is a simple reflected infrared system that uses a transmitted light and a receiving photocell. In embodiments, presence detection may use infrared, sonic, radar, touch or visible light, by way of non-limiting example, as the transmission media for presence detection. The presence detector may use a passive detector to activate the active presence detection, such as to assure positive presence and non-presence detection. For example, passive detection may comprise sonic reflection, noise level increase or decrease, touch, photo shadow, or transmitted light variation. Passive detection may be appreciably enhanced using the CPU/software managed system disclosed herein, such as by using a wide range of environmental sensors, for example. These passive detection methodologies may also allow for active monitoring for presence, such as wherein passive detection may serve as a precursor for active (and more resource intensive) detection, as mentioned above, or such as wherein presence detection may be selectable as between passive and active using the same sensor/detector suite.

The CPU-based management system discussed herein may include a controller 18 and control system 24, as referenced above, and these control elements may exert control in a variable manner that is situation dependent. For example, the control elements may oversee that controlling and processing of information from the presence detector; may activate a mechanical water (or cleaner) dispenser using an electro-mechanical activation (such as a solenoid or motor); may manage the system connection to a network, such as the internet, through either a wired or a wireless function such as WIFI, Bluetooth, or ZigBee (system connection may include the controller to control system link, by way of non-limiting example); may track dispense rate and material usage; may monitor system health and run system diagnostics; may perform "cleansing" cycles to avoid contamination/bacterial buildup; may perform system reset; may perform remote dispense activations; may power monitor (such as current charge level, and/or system charging such as if the system has a rechargeable power source); and may detect manual user actions, such as dispense button depression detection.

Figure 2:
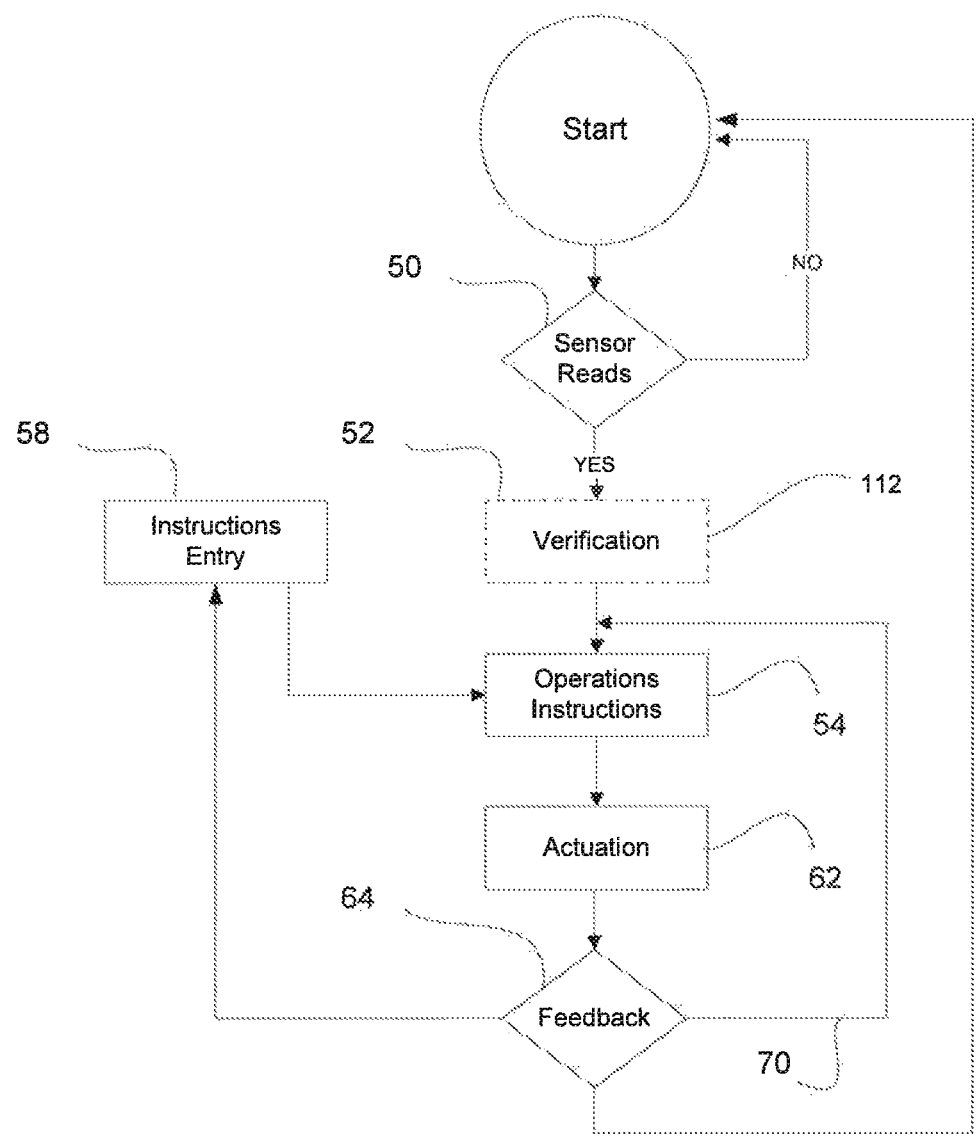
FIG. 2 illustrates a flow diagram of an exemplary method according to the disclosure.

FIG. 2 is a flow diagram illustrating a method in accordance with the disclosure. As shown, at step 50, a user presence (or non-presence, based on the application) at a basin may be detected by one or more of at least one sensors. Optionally, at step 52, user presence may be verified.

At step 54, a local controller may receive instructions on operation of the basin, such as may be entered into a remote control system at step 58. These instructions may indicate actuations based on sensor readings, and may be relayed to the controller from the control system in real time upon sensor reading, or may be stored, permanently or temporarily, at the controller.

Based on sensor detections at step 50 (and/or optionally 52), the controller causes an attempted actuation of aspects of the basin, such as causing a flush, an output of soap, an output of hot air, an output of a cleansing cycle, or the like, at step 62. At step 64, feedback is provided to controller, and optionally to control system, based on the sensor detections (steps 50, 52) and/or attempted actuation of the basin (step 62). That is, the attempted actuation at step 62 may serve to provide the feedback, or may be caused by the feedback. Feedback at step 64 may include, for example, errors, malfunctions, number of times of operation, time of operation, environmental factors, and the like. To the extent, for example, that errors or malfunctions are included in the feedback at step 64, remedial steps, such as resets, error reports for on-site maintenance, or the like, may be provided to the controller at step 70.

Figure 3:
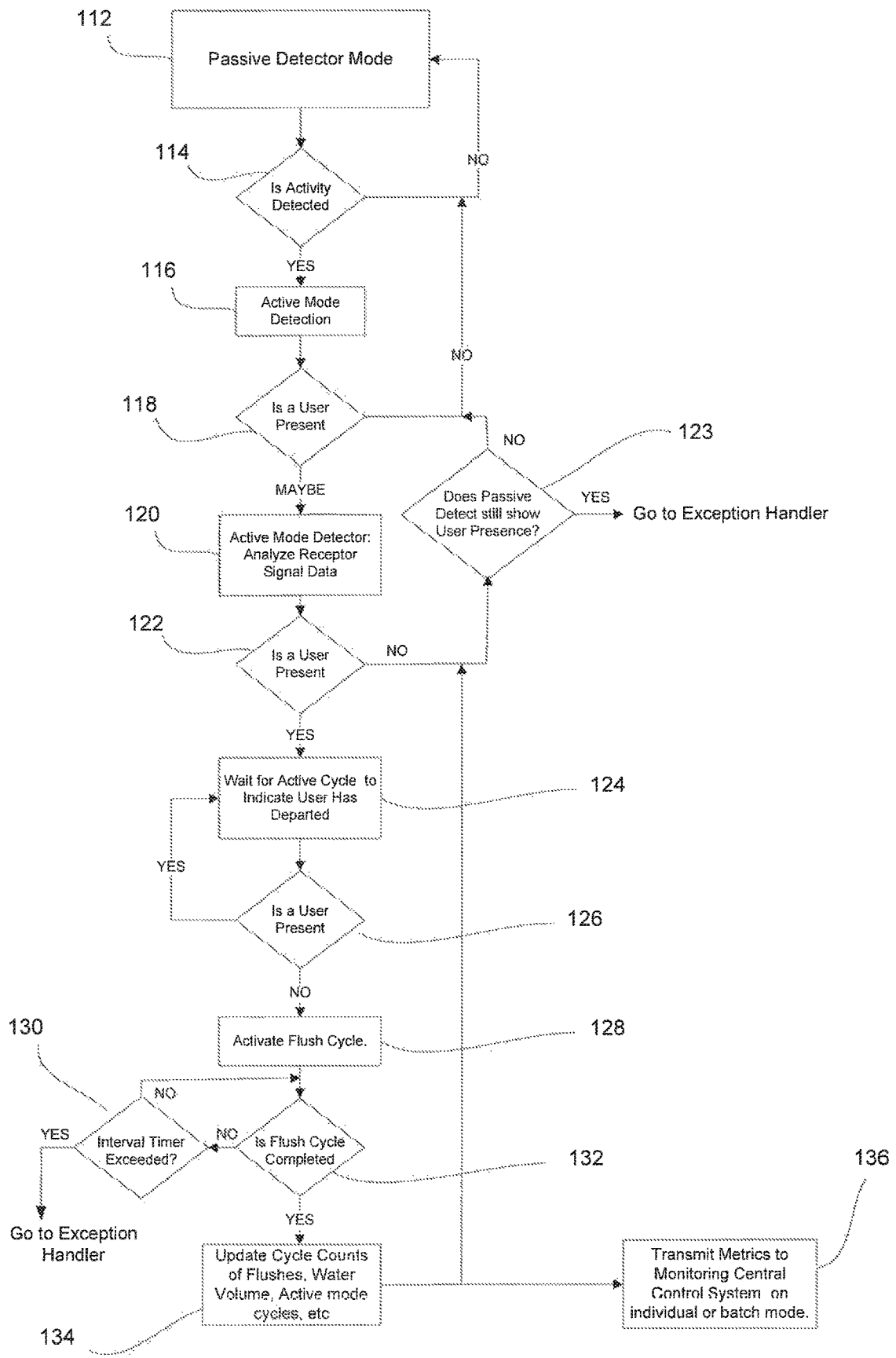
FIG. 3 illustrates a flow diagram of exemplary operation for a commode receptacle according to the disclosure.

As illustrated in FIG. 3 and in an exemplary operation for a receptacle flush, the disclosed apparatus, system and method may start in presence detection mode 112. When the system detects that the ambient environment detection status has changed at step 114, the system may move from passive to active detection 116, if applicable (if not applicable, the system may engage only in a single stage user detection). In the detection state, the applicable receptor (photo, sonic, radar, touch, etc.) may provide output signals for analysis by the CPU/software to decide user presence at steps 118, 120, 122, 123. If a user is present, the CPU/software may enter a wait cycle within the detection cycle to await departure of the user 124. The CPU/software may, in that state, continue analysis the output signal from the presence detector.

Once it is determined that a user is no longer present 124, 126, 128, 132, 134, 136—or is now present, based on the embodiment (such as subject to the aforementioned exemplary delay to insure user presence), the controller may move the system into the activation cycle. The CPU/software may activate a solenoid or motor for a fixed interval of time, such as to dispense: water, at a fixed and known volume at step 128. The solenoid or motor may then be deactivated at the end of a predetermined active interval, or upon non-presence detection.

Upon completion of the dispense cycle, the CPU/software may report, such as updating the count and material use volume, and may update charge power levels, at steps 134 and 136, and may thereafter transition back to the passive detection state. At the end of each dispense cycle, or upon completion of a predetermined number of cycles, the system may transmit, such as to a central host and/or a tracking system, the dispense data of the completed cycle(s). Alternatively, the system may transmit data in batch mode, such as at a fixed time, flush count interval, on demand from the host system, or during maintenance intervals.

Figure 4:
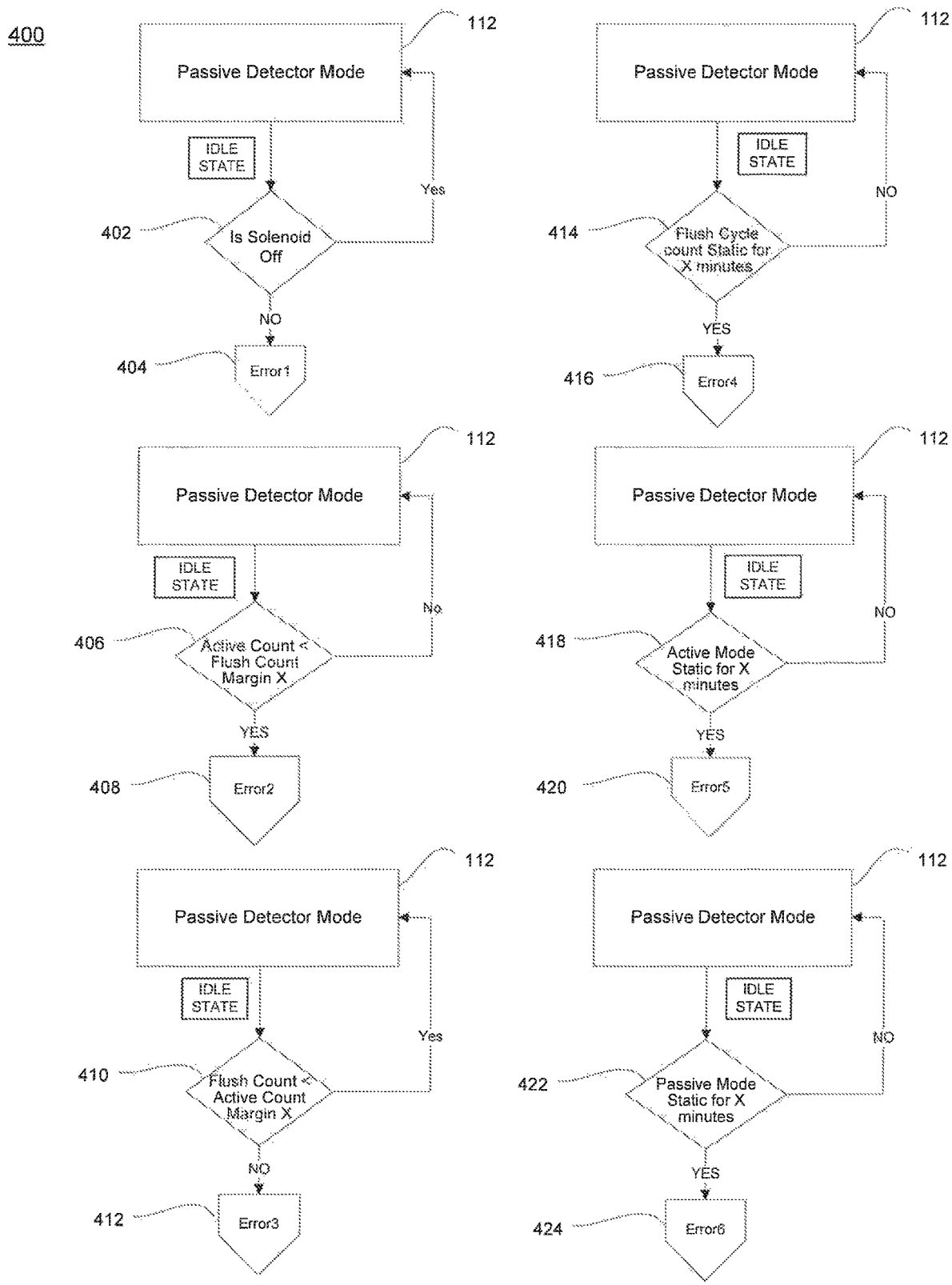
FIG. 4 illustrates state diagrams for exemplary detection modes according to the disclosure.
Figure 5:
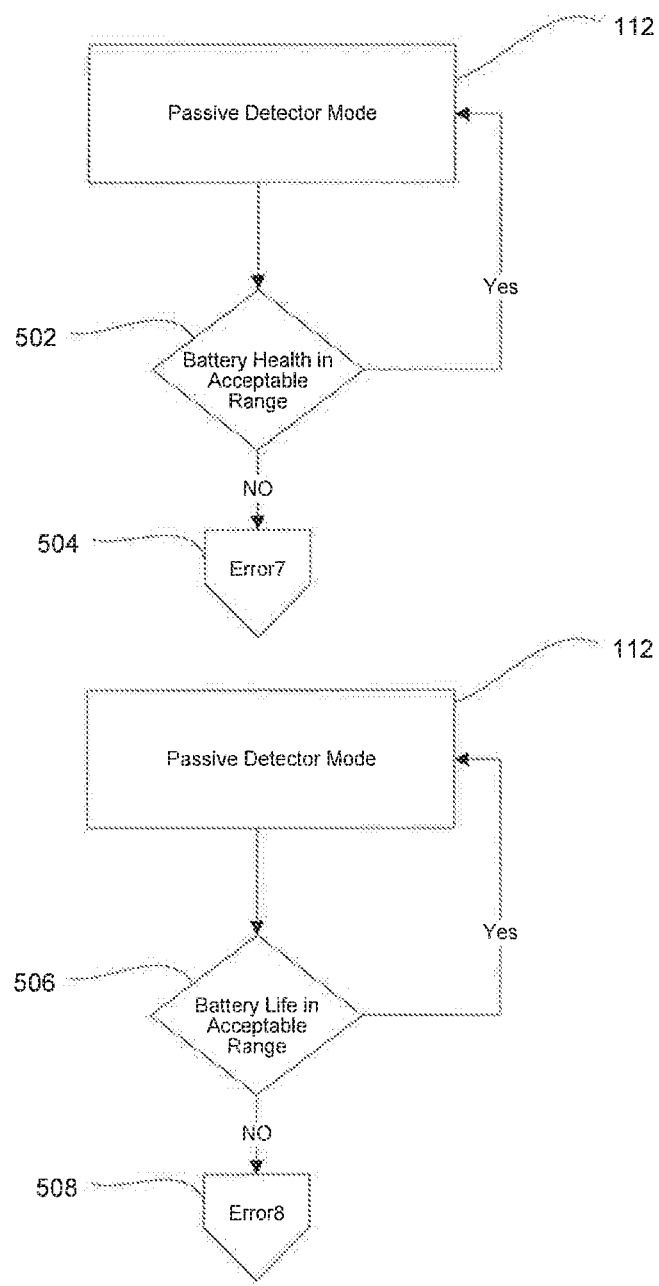
FIG. 5 illustrates state diagrams for exemplary detection modes according to the disclosure.

As mentioned, diagnostics may run during system idle times (such as passive detection mode) and/or at fixed time intervals, as illustrated in the exemplary state diagram of FIG. 4. Health diagnostics may monitor for functional defect states, such as: checking the system for repeated cycles when a user is not present (112, 406, 408); a lack of cycles when a user is present (112, 410, 412); detection circuit stuck in passive or active mode (112, 414, 416 E4, 112, 418, 420 E5, 112, 422, 424 E6); solenoid or motor stuck (on or off) (112, 402, 404); battery or charging status (112, 502, 504); and/or projected battery life (such as of primary cells and/or charge state of rechargeable batteries) (112, 506, 508), by way of non-limiting example, and may provide error flags to the control system when errors are detected. For example, power usage monitoring and diagnostics may monitor current draw on any and all receptacle output devices, thereby allowing power usage management and predictive failure analysis for electrical and electro-mechanical devices. Power usage, monitoring and power diagnostics will follow the diagnostic models previously illustrated in FIGS. 4, 5 and 6.

A cycle count of dispense actions and user presence may be maintained, such as in a local memory (dynamic or non-volatile) and/or in a remote memory associated with the CPU. Such counts may be reconciled and may be compared against a margin of error difference in order to assess compliance with normal operation. Deviation outside of the normal parameters may cause the system to generate an error state flag, which may be communicated through a communication channel to the monitoring system (such as a building central management control computer, central host—which may be structured to monitor on a building-by-building basis, for example—or the like) that a device error has occurred. The device may correspondingly run a diagnostic cycle and/or may transmit information to help diagnose the error condition to the host or central control system.

Figure 6:
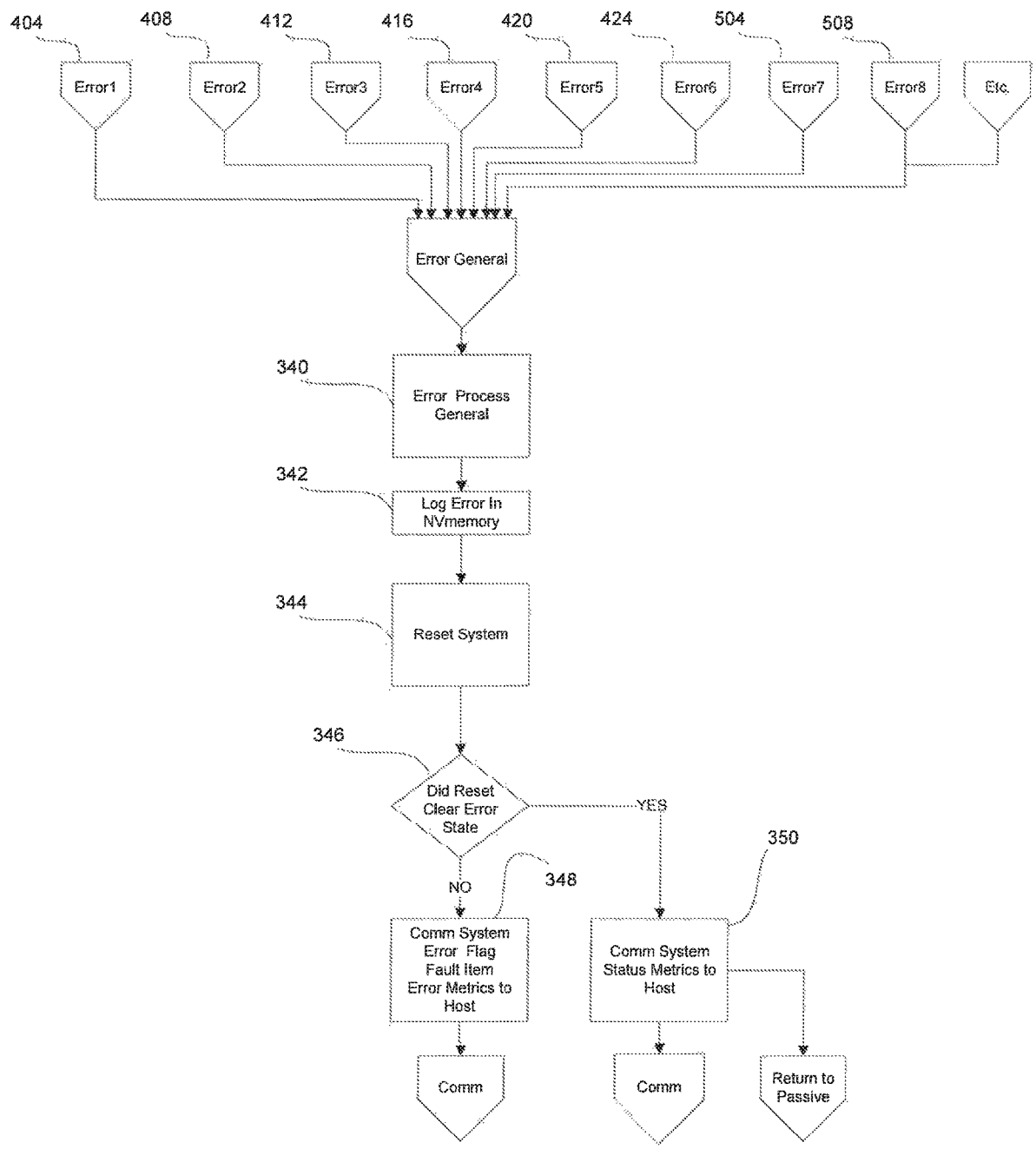
FIG. 6 illustrates exemplary states and an exemplary flow for a diagnostics mode according to the disclosure.

Once an error is detected (e.g., via the processes of FIG. 4 or 5 and FIG. 6), a local diagnostics mode, such as is illustrated in the exemplary flow diagram of FIG. 6, may isolate the error to a function and may transmit the error to the central monitoring system, such as for request of instruction for corrective action based on a rule set, shown at step 340. The central system may log the error, and may remotely invoke the local aspect of the controller module to log the error and/or enter a local diagnostic state that supports a more detailed level of diagnostic efforts, at step 342. For example, in the diagnostic state, normal operation may or may not be overridden to further isolate the error condition. Overriding normal operation may entail issuing host commands to perform: dispense actions per prescribed action intervals or test intervals; system deactivation; system reset; or other related test commands, by way of non-limiting example, as shown at step 344. Diagnostics may be invoked via direct local activation or remote activation. Based on the results of any diagnostics and any corrective efforts 346, the system may be deactivated or reactivated to normal operation, such as upon resolution of the error condition cause(s), 348, 350.

Those of skill in the art will appreciate that the herein described apparatuses, systems and methods may be subject to various modifications and alternative constructions. There is no intention to limit the scope of the disclosure to the specific constructions described herein. Rather, the herein described apparatuses, systems and methods are intended to cover all modifications, alternative constructions, and equivalents falling within the scope and spirit of the disclosure and its equivalents.

What is claimed is:

1. A toilet for receiving human waste, comprising:
   a toilet basin for receiving a viscous element suitable to expunge the human waste from the toilet basin via a dynamic volume of the viscous element comprising a single variable burst flush;
   at least one sensor physically associated with the toilet basin;
   at least one actuator responsive to the at least one sensor, wherein actuation of the actuator outputs the single variable burst flush to the toilet basin;
   a controller at least partially physically proximate to the toilet basin and capable of controlling the actuation of the at least one actuator to expunge the human waste; and
   a control system communicative with the local controller over at least open data path, the control system imposing a plurality of human-waste specific rules to the controller, the plurality of rules including at least the dynamic volume of the viscous element needed to expunge the human waste by clearing the toilet bowl under a plurality of different circumstances comprising a plurality of different amounts of human waste in the toilet bowl.

2. The toilet of claim 1, wherein the viscous element comprises a liquid.

3. The toilet of claim 2, wherein the liquid comprises one of water, soap, and cleanser.

4. The toilet of claim 1, wherein the at least one sensor comprises a presence detector.

5. The toilet of claim 1, wherein the at least one actuator comprises at least one of a solenoid, motor, and microcontrollers.

6. The toilet of claim 1, wherein the at least one sensor comprises an environmental sensor.

7. The toilet of claim 1, wherein the data path comprises at least one selected from the group consisting of Ethernet, Wi-Fi, Bluetooth, ZigBee, or a serial interface.

8. The toilet of claim 1, wherein the control system comprises a graphical user interface suitable for entry of at least ones of the plurality of rules.

9. The toilet of claim 1, wherein the at least one controller comprises a computer processor for execution of code stored in a computing memory communicatively associated therewith.

10. The toilet of claim 1, wherein the control system comprises a computer processor for execution of code stored in a computing memory communicatively associated therewith.

11. The toilet of claim 1, wherein ones of the plurality of rules comprise monitoring.

12. The toilet of claim 1, wherein ones of the plurality of rules comprise diagnostics.

13. The toilet of claim 1, wherein ones of the plurality of rules comprise upgrading.

14. The toilet of claim 1, wherein ones of the plurality of rules comprise reporting.

15. The toilet of claim 1, wherein the viscous element comprises a gas.

16. The toilet of claim 1, wherein the plurality of rules comprise error codes generated upon malfunction of the at least one actuator.

17. The toilet of claim 16, further comprising an alarm sounded proximate to the basin upon generation of one of the error codes.

18. The toilet of claim 16, wherein the plurality of rules further comprise a response for imposition to the at least one controller in association with a particular one of the error codes.

* * * * *